June 4, 1940.　　O. F. NILSSON ET AL　　2,203,229
MEANS FOR AGING LIQUIDS
Filed Aug. 11, 1937　　2 Sheets-Sheet 1
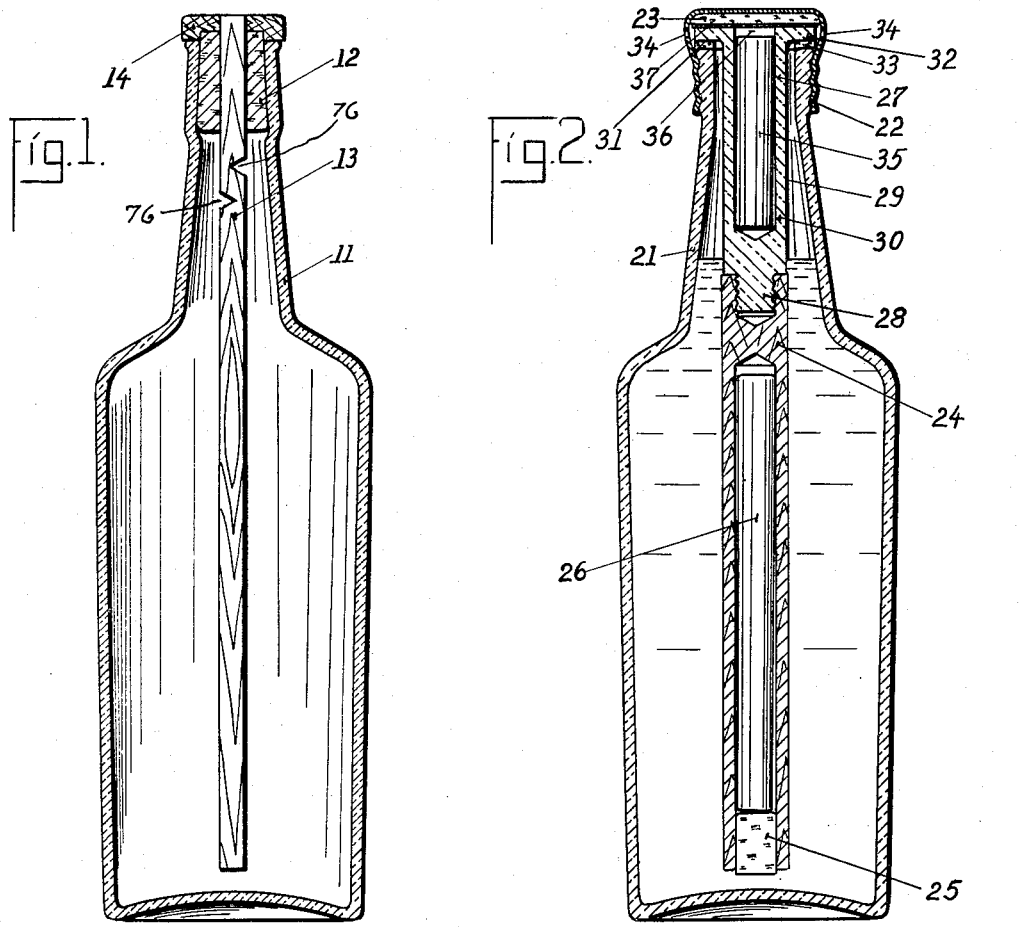
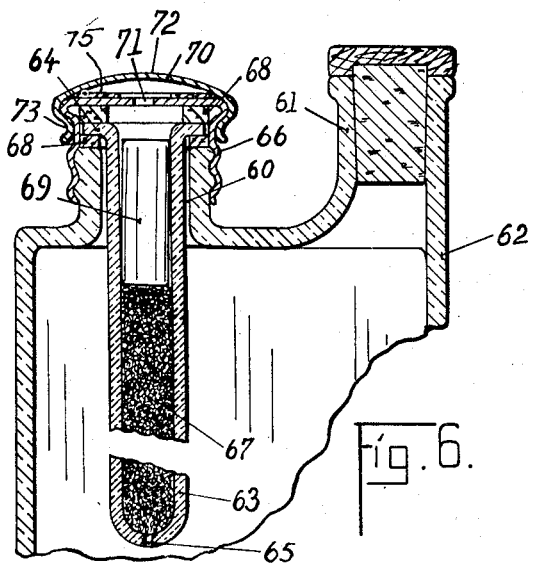
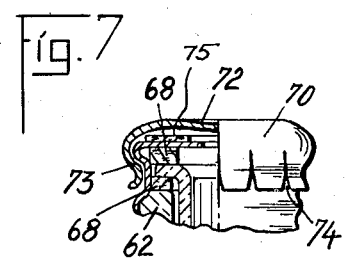
OSCAR F. NILSSON,
KARL F. NILSSON.
INVENTORS.
BY
ATTORNEY.

June 4, 1940.  O. F. NILSSON ET AL  2,203,229
MEANS FOR AGING LIQUIDS
Filed Aug. 11, 1937   2 Sheets-Sheet 2
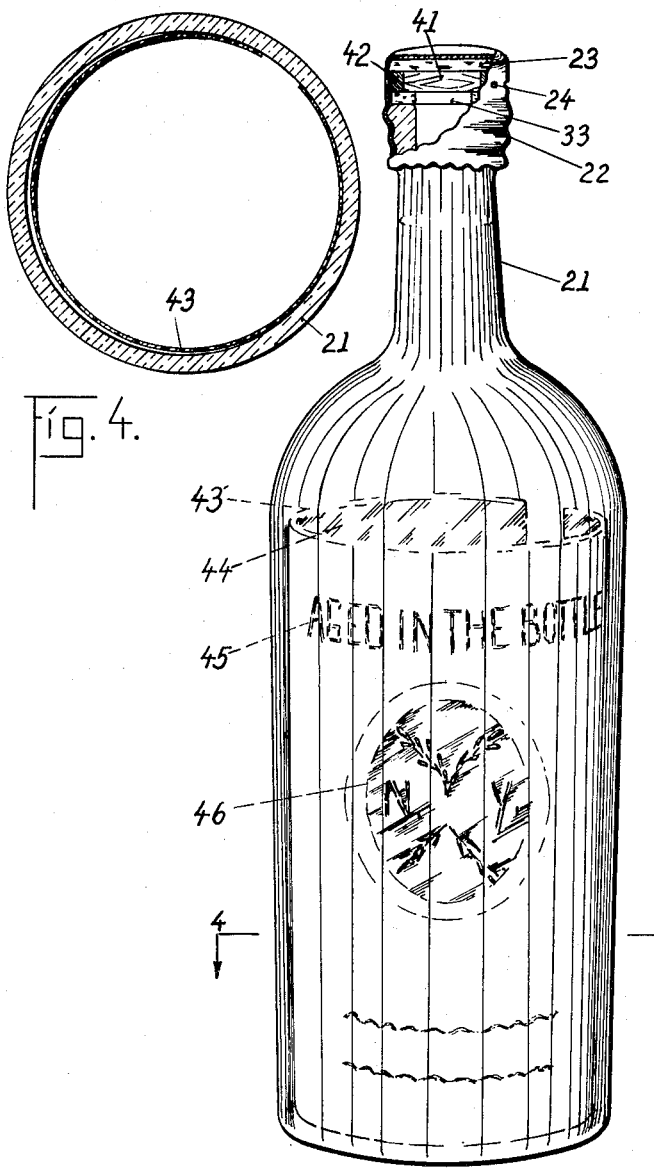
Fig. 4.
Fig. 3.
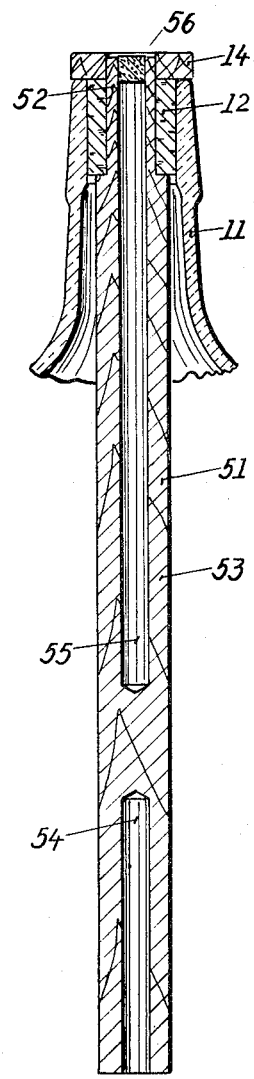
Fig. 5.
OSCAR F. NILSSON,
KARL F. NILSSON
INVENTORS.
BY *Rudolf Wildhagen*
ATTORNEY.

Patented June 4, 1940

2,203,229

UNITED STATES PATENT OFFICE 2,203,229

MEANS FOR AGING LIQUIDS

Oscar F. Nilsson and Karl F. Nilsson,
New York, N. Y.

Application August 11, 1937, Serial No. 158,471

2 Claims. (Cl. 99—277.1)

The herein described invention concerns vessels and implements for aging and maturing liquids, such as liquors, alcoholic mixtures, perfume, other combinations of essential oils, etc. Aging is most commonly known in connection with wine and distilled liquors, and will be hereinafter dealt with at times in reference and specific application to such liquors, in order not to render this specification too prolific. But it is well understood that this invention applies in all instances, where liquids are to be aged in more or less close analogy to the aging and maturing of more frequently matured and aged liquors.

Since times immemorial wooden vessels and more particularly barrels and casks, have been the preferred, and practically exclusive medium for aging or maturing liquids. The action taking place and even the changes effected do not appear to be fully known, probably because we do not have to do with any single or particular chemical or physical process, but a process which is rather complex. Various characteristics are relied upon in the material of the container, which is preferably fibrous vegetable matter and at times specially treated, e. g. charred, oak being in many instances given preference over other materials of this kind. All such materials coming into question for aging will be hereinafter known by the collective term wood, generally.

Porosity of the wood must be a factor relied on in aging, evidently promoting contact with the outer air, and therefore favoring any step of oxidation. A certain filtering action, also in connection with parts of the wood reduced to charcoal, has been relied upon. Again for reasons of the porosity and hydroscopic quality of the wood there appears to be a selective evaporation, so that undesirable ingredients can be removed under favorable circumstances. Again the wood appears to act as a catalyst. In many instances the liquid even appears to acquire new constituents from the wood, or there may be an exchange of constituents.

We are, on the other hand, cognizant of the fact that wood is costly, bulky, perishable, not always uniform in quality and structure; it changes under atmospheric condition, is subject to cracking and warping, never leak-proof, is difficult to assemble or to shape to the desired sizes and forms, and has definite shortcomings in respect to hygiene.

The advanced industry of today offers to us many materials, e. g. metal and glass, or plastics generally, which do not have the disadvantages just enumerated in respect to wood when they are changed into vessels. On the other hand there is a prevailing opinion, in accordance with which liquid cannot age in enclosures made out of metal or glass. This may be true.

Still it is an object of this invention to allow a liquid to age, mature or ripen in an essentially non-wooden vessel, e. g. a container mostly made out of metal or a plastic.

In attempting a solution of this problem, we have established that neither in order to effect the communication with the outside necessary for the aging of a liquid accommodated in an enclosure, is it necessary to make the entire envelope out of wood, nor is the amount of wood necessary to make a wooden enclosure required for interaction with the liquid, when an aging process is to be performed.

This invention therefore concerns basically in connection with a non-wooden vessel such organization and coordination of wooden parts and elements, as necessary for aging.

We are aware that on account of the aforementioned and other difficulties encountered in connection with wood, the aging process has heretofore been almost exclusively carried out by the original manufacturer of the aged or matured liquid, who may not thoroughly carry the aging or maturing process to completion, because aging requires time, and the factor of time and cost of wooden vessels is a great economical item for the manufacturer.

On the other hand most aged or ageable liquids pass through considerable time of storage after they have left the manufacturer and before they are eventually used or consumed. But vessels in which such liquids leave the manufacturer, or vessels into which they are thereafter filled, are rarely made of wood, but of a substance not permitting aging, so that aging cannot continue, when such a liquid has left the manufacturer. Still, not only in consideration of the quality of aged liquids, but also in respect to the health of the consumer, it is most desirable to effect continuation of the aging during storage and handling of such liquid; handling is here referred to advisedly because agitation might also be an important attribute of aging.

It is therefore another object of this invention to provide for containers, e. g. bottles, etc., which are convenient for commerce and every day use, allowing aging of the contents, but not exclusively made of wood.

These and other objects which will be hereinafter more clearly recognized have caused us to carry out numerous and costly experiments, and we have developed a great number of vessels and containers, and/or implements used in connection therewith, made in accordance with this invention, as generally outlined above, and all yielding satisfactory aging. But it would carry us too far and it would be hardly possible to describe all the various modifications of containers found to fulfill the objects just mentioned; we will describe herein the invention by way of examples, which at this time appear to be most illustrative, these examples being of course submitted by way of explanation, but not of limitations of the instant invention.

In the accompanying drawings:

Fig. 1 is a cross-sectioned elevation of a container of our invention.

Fig. 2 shows, in a similar view, a modification, a filled bottle in this instance.

Fig. 3 shows a perspective, partly sectioned modification of still another bottle or container and implement of our invention.

Fig. 4 shows a corresponding cross-sectioned top view, taken at the level indicated by the numerals 4 and arrows in Fig. 3.

Fig. 5 is the cross-sectioned view of another modification of our invention. The non-wooden container is here shown in part only.

Fig. 6 is a cross-sectioned view of the upper end of a container providing an outlet apart from the aging window.

Fig. 7 is a corresponding, partly sectioned detail view of the said outlet, illustrating an alternative "venting" position.

Similar numerals refer to similar parts throughout the various views.

The non-wooden container or vessel 11 of Fig. 1 is shown to be closed by a stopper 12 which may be made out of cork. A wooden stick 13 extends through the stopper 12, the latter closing therearound. The stick 13 may be shown in such length that it would submerge in a liquid contained in vessel 11. The top of stick 13 is free, and therefore it contacts with the outer atmosphere and the latter may diffuse into the stick. The stick may be secured in a disc 14, the latter resting also on top of the vessel or bottle 11.

The grain of stick 13 preferably runs in the direction of the axis thereof, and it may be charred. While charring may be useful for aging, and may enchance absorption, diffusion, filtering of the contents of the bottle and communication with the outside of said contents, by way of the capillaries of the wood, we generally do not care to expose charcoal in greater thickness to a liquid in which it is submerged, as in a transparent bottle, since it might produce a dark, undesirable though harmless sediment on the bottom of the bottle. This does of course not preclude a light charring of the surface of the stick 13 or of a part thereof, e. g. in a design as it is shown in more detail in connection with Fig. 3 described hereinafter.

The non-wooden container 21 of Fig. 2 is closed by a screw cap 22 of conventional type. A closure disc 23, made of cork for instance, is arranged on the bottom of the screw cap 22, and may be attached thereto. The remaining parts of the assembly of Fig. 2 may be removed, whereupon the screw cap 22 can close directly upon the top of the container 21.

The wooden part 24 is hollow, and closed at its lower end, by a cork 25 for instance. In the hollow wooden part 24 may be accommodated an absorbent or filtering material, like a charred piece of wood 26, or a charcoal filling generally. To the wooden part 24 is attached the porcelain filter 27, for instance by way of a threaded lower end 28; the cylindrical surface 29 of the shoulder 30, and the bottom surface 31 of the top flange 32 of the porcelain filter 27, may be glazed whereas all other faces remain pervious. The flange 32 of the filter 27 seats upon the top of the neck of the container 21, by way of a cork washer 33 for instance, and it is clamped down by the cap 22.

Some perforations 34 are arranged around the circumference of cap 22, and permit communication between the liquid contained in vessel 21 in the outside by way of osmosis through the wooden part 24 and the filter 27. Charcoal 35 or another filtering substance may also be accommodated in the counterbore 36 extending down from the top into the filter 27. A separating sheet 37 extends over the top of the filter 27 underneath the cork disc 23.

It appears to be one of the duties of the wooden vessel in connection with the old aging processes, that the pressure upon the inside of the barrel or cask is balanced against that on the outside, i. e. the atmospheric pressure; at any rate it is not desirable to have a pressure above that of the atmosphere upon the inside of a barrel or cask in which aging is to take place. On the other hand it may not be desirable freely to exchange the light essences suspended on top of the liquid to be aged, against outside air by way of diffusion through the wooden envelope. Under such circumstances the arrangement of Fig. 2 yields an ideal solution because the capillary wooden part and the porous inside of the filter 27 allow osmotic-conductive communication of the liquid with the outside, and therefore an equalization of pressure. But vapors collecting on top of the liquid in the neck of the bottle or container 21 cannot escape freely to the outside, because they are confronted towards the center and upwardly by the glazed parts of surface of the filter 27, the cork 33 and the inside of the neck of bottle 21 confining the said vapors otherwise.

It suggests itself to those acquainted with this art to obtain a similar effect by providing the wood section or window extending through the wall of the non-wooden enclosure below the liquid contents (say we turn any of the bottles upside down). But the effect will not be quite the same, because it will in that instance not be upwardly diffused parts of the liquid, which will communicate with the outside atmosphere.

In connection with Figs. 3 and 4 we again have a container 21, a screw top 22 provided with perforations 24, and a cork inlay 23. A wooden disc 41 surrounded by a filtering ring 42 is arranged at the level of the perforations 24, provides for restricted communication of the contents of the bottle with the outside, and is retained in position by being clamped between the cork inlay 23 and a cork washer 33 on top of the neck or bottle 21.

A thin sheet of aging material 43, e. g. wood, may be rolled up and thus inserted through the neck of the bottle thereinto. Upon the inside of the bottle the sheet 43 will then stretch out and extend around the inside of the bottle, as shown. The sheet 43 may be charred upon the inside 44, and it may be provided with a charred legend, like markings or designs 45 and 46.

While the wooden parts of Fig. 1 are sufficient to occasion an effective aging of the contents of the bottle, the said wooden stick or part 13 being for instance made of oak, we may provide for a greater volume of the wooden part, or a greater wood surface in contact with the outer air, or a greater surface upon the inside of the bottle, by small changes of the arrangement, as indicated in Fig. 5. Here the wooden part 51 has a neck 52 of smaller diameter, where it extends through the stopper 12 and into the disc 14, whereas the portion 53 of said wooden part 51 below the stopper 12 is larger in diameter. A counterbore 54 from the bottom into the wooden bore 51 may serve to provide greater contact of said part with the liquid contents of the bottle 11.

A similar bore 55 into the top of the wooden part 51 will, by way of contrast, increase the wood surface exposed to the outside air. A porous smaller stopper 56 may again close the upper opening of bore 55, in order to prevent foreign matter from entering the bore, or to reduce convection in said bore.

The wood passage through or wood window in the non-wood enclosure are shown herein in connection with the outlet of the enclosure on account of practical considerations of simplicity and convenience only.

The opening 60 of the aging window and the stoppered outlet 61, through which a container 62 may be filled or from which we pour in the customary manner, are arranged apart from each other in the modification of Fig. 6. A pervious implement 63, made for instance of glass, shaped for instance like a test tube, and perforated by holes 65 below the level of the liquid in the full bottle, depends through opening 60 from a flare 64. The implement 63 is retained in position by a screw cap 66, the flare 64 being sealed onto the rim of opening 60 and onto the bottom of cap 66 by cork washers 68. The cap 66 is perforated at the center by opening 71. Thus there is no direct communication between the gas above the liquid bottle contents and the outside.

But temperature changes will cause the liquid in the bottle to be pressed through perforations 65 into the test tube 63 and to rise therein, percolating the charred shavings or wooden pellets 67 rising through the charcoal 69 thereabove. The tube 63 should therefore be dimensioned so that it always accommodates the liquid rising therein.

Regardless of temperature changes the liquid contents will always be circulated slowly, up and down through the solid contents of tube 67, as long as the bottle is not quite full—as it is normally the case. The small amount of air and vapors above the liquid in the container will expand and contract with a falling or increasing pressure of the atmosphere, i. e., barometrically. A correspondingly dimensioned tube 63 may therefore be sealed into the opening of larger containers like barrels, depend into the contents thereof and accelerate aging, all liquid contents of the barrel filtering eventually, under barometric force, up into and out again from the bottom of the immersed tube or implement 63, a tube being readily replaceable.

For purposes of transportation or handling of a barrel thus equipped, or of a bottle 62 for instance, provisions may be made for temporarily closing the vessel while being transported or handled.

A cap 70 suggests itself for such purpose, which may either seal or may permit communication of tube or implement 63 with the atmosphere, a change from one to the other being effected by simple manipulation. The cap 70 is made of resilient metal and has a protruding portion 72 on the top, which portion is yieldable to pressure, say of a finger, and that portion 72 of the cap snaps under pressure into the concave position, in which it is shown in Fig. 7.

When the cap is depressed along its circumference onto the bottle neck support, the said portion 72 snaps back into the position of Fig. 6. By virtue of the notches 74 the stresses set up by the snapping portion 72 are allowed to exert themselves, bending the notched lower periphery 73 of the cap out and in again, when the cap passes from the position of Fig. 6 to that of Fig. 7 and back again. Thus the cap 70 sealing the tube 69 upwardly by way of a cork washer 75 in Fig. 6, by reason of closing tightly, unseals and—fitting loosely—allows gas to circulate past it, when it is in the position of Fig. 7.

Thus a cap 70 may allow a convenient change from a sealed position—for transportation and handling—to an open ventilating position—for aging. But, of course, other closures may be used for the same purpose, and, vice versa, a cap 70 may replace the closure arrangement of other figures, e. g., Fig. 2.

The parts near the ventilating opening should be dimensioned liberally in order to prevent a rise of the contents of the container, under temperature or barometric changes. Likewise the rise of the liquid contents to the surface by way of osmosis should be avoided, e. g., in the arrangement of Fig. 1, by notches on opposite sides of a charred rod 13, such notches interrupting the continuity of the grain of said rod, above the top level of the liquid.

Although we have shown and described one form of embodiment of our invention in detail, yet we do not wish to be limited thereby, except as to the state of the art and the appended claims may require, for it is obvious that various modifications and changes may be made in the form of embodiment of our invention, without departing from the spirit and scope thereof.

What we claim is:

1. As a container for accommodating and for aging an ageable liquid, a substantially non-wooden enclosure, a porous member suspended in said enclosure to below the normal liquid level and exposed to the outside atmosphere, wood in said enclosure osmotic-conductively connected with said member and immersed in the contents of said enclosure when the enclosure is filled, said porous member having means sealing it towards the gas in said enclosure above the normal liquid level in said enclosure.

2. Means for aging the contents of a non-wooden enclosure, comprising porous stone suspended in the neck of said enclosure, laid bare to the outside atmosphere and extending below the level of a liquid contained in said enclosure, said stone being circumferentially glazed so as to seal it towards the gases in said enclosure above the liquid contents thereof, and a wooden aging implement submergedly supported by said stone in said enclosure.

OSCAR F. NILSSON.
KARL F. NILSSON.